(12) United States Patent
Huang et al.

(10) Patent No.: US 8,243,679 B1
(45) Date of Patent: Aug. 14, 2012

(54) INITIATING A HANDOVER IN A COMMUNICATION NETWORK

(75) Inventors: Renxiang Huang, Sunnyvale, CA (US); Claudio R. Lima, San Jose, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1119 days.

(21) Appl. No.: 11/950,777

(22) Filed: Dec. 5, 2007

(51) Int. Cl.
*H04W 36/00* (2009.01)

(52) U.S. Cl. ........................................ 370/331; 455/436

(58) Field of Classification Search ................ None
See application file for complete search history.

(56) References Cited

U.S. PATENT DOCUMENTS

| | | | |
|---|---|---|---|
| 5,530,912 A | 6/1996 | Agrawal et al. | |
| 6,052,598 A | 4/2000 | Rudrapatna et al. | |
| 6,845,238 B1 * | 1/2005 | Muller | 455/436 |
| 7,020,087 B2 | 3/2006 | Steinberg et al. | |
| 7,363,037 B2 * | 4/2008 | Huang et al. | 455/436 |
| 7,366,120 B2 * | 4/2008 | Handforth et al. | 370/310 |
| 7,848,241 B2 * | 12/2010 | Natarajan et al. | 370/238 |
| 2002/0068571 A1 | 6/2002 | Ohlsson et al. | |
| 2009/0257361 A1 * | 10/2009 | Deshpande et al. | 370/252 |
| 2010/0056151 A1 * | 3/2010 | Veres et al. | 455/436 |

OTHER PUBLICATIONS

Christophoros Christophorou, et al.; "Radio Resource Management in MBMS Enabled 3G Mobile Cellular Networks: A New Handover Control Approach," 2007; 7 pages; Department of Computer Science, University of Cyprus; Nicosia, Cyprus; http://www.ew2007.org/papers/1569014786.pdf.

* cited by examiner

*Primary Examiner* — Andrew Lai
*Assistant Examiner* — Alex Skripnikov (57) ABSTRACT

Systems, methods, and software are provided to manage a handover of a mobile station from a source base station to a target base station. In an embodiment, a method comprises monitoring a condition of a first backhaul link between the source base station and an access node, processing the condition of the first backhaul link to determine if the handover should be initiated, and in response to determining that the handover should be initiated, transmitting a handover request to initiate the handover.

18 Claims, 11 Drawing Sheets

INITIATING A HANDOVER IN A COMMUNICATION NETWORK

TECHNICAL BACKGROUND

Wireless communication services have become a ubiquitous characteristic of the modern world. Users access wireless communication services using a wide variety of devices, such as mobile phones, personal computers, personal digital assistants, personal and personal media devices, as well as other types of devices. Accordingly, users have grown to enjoy the mobility provided by wireless communication services.

In a typical wireless environment, the provisioning and delivery of wireless communication services requires many different elements. In an example, a wireless communication service area can be defined by a radio frequency (RF) pattern generated by RF transmissions from a nearby base transceiver station (BTS). The BTS is often times linked to an access network via a backhaul link. The access network can include a base station controller, a mobile switching center (MSC), or a gateway system, as well as other elements. The mobile station establishes a communication path via the BTS and the access network to other communication networks to obtain wireless access to communication services, such as voice, video, and data services.

Increasingly, the condition of the backhaul link influences the overall quality of a particular service session. For example, a call may be dropped if the backhaul link lacks sufficient capacity for the session. In another example, a high speed video service may be degraded if the backhaul link is congested.

OVERVIEW

In various embodiments, systems, methods, and software are provided to manage a handover of a mobile station from a source base station to a target base station. In an embodiment, a method comprises monitoring a condition of a first backhaul link between the source base station and an access node, processing the condition of the first backhaul link to determine if the handover should be initiated, and in response to determining that the handover should be initiated, transmitting a handover request to initiate the handover.

In another embodiment, a communication system comprises a processing system and an interface. The processing system monitors a condition of first backhaul link between the source base station and an access node. The processing system processes the condition of the first backhaul link to determine if the handover should be initiated. The interface transmits a handover request to initiate the handover in response to determining that the handover should be initiated.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In order to achieve wireless mobility, many complex processes must be executed by the various elements involved in providing wireless communication services. A handover (sometimes referred to as a handoff) is one such process that assists with providing wireless mobility. When a mobile station leaves one service area and enters another service area, a handover is executed to transfer the mobile station from the source BTS in the first service area to a new, target BTS in the second service area.

Typically, the handover decision is made based on the relative quality of the RF transmissions from the source BTS and the target BTS. For instance, if the quality of the RF transmissions from the source BTS becomes degraded below a threshold level, either the mobile station, BSC, MSC, or some other element in the access network may initiate a handover process to transfer the mobile station to the target BTS.

At times, present handover processes can negatively impact the quality of wireless communication services. In one example, transferring a mobile station participating in a high bandwidth communication session to a target BTS may over burden the target BTS. Moreover, the backhaul link between the target BTS and the access network may become congested as a result of the transfer.

In another example, the RF transmissions from a source BTS may be above a threshold level that would trigger a handover. However, the backhaul link carrying traffic between the source BTS and the access network may be congested. It would be desirable if such backhaul conditions could be alleviated, even though the quality of the RF transmissions may not require a handover, because congestion could cause jitter or delay in communications exchanged over the backhaul link.

Figure 1:
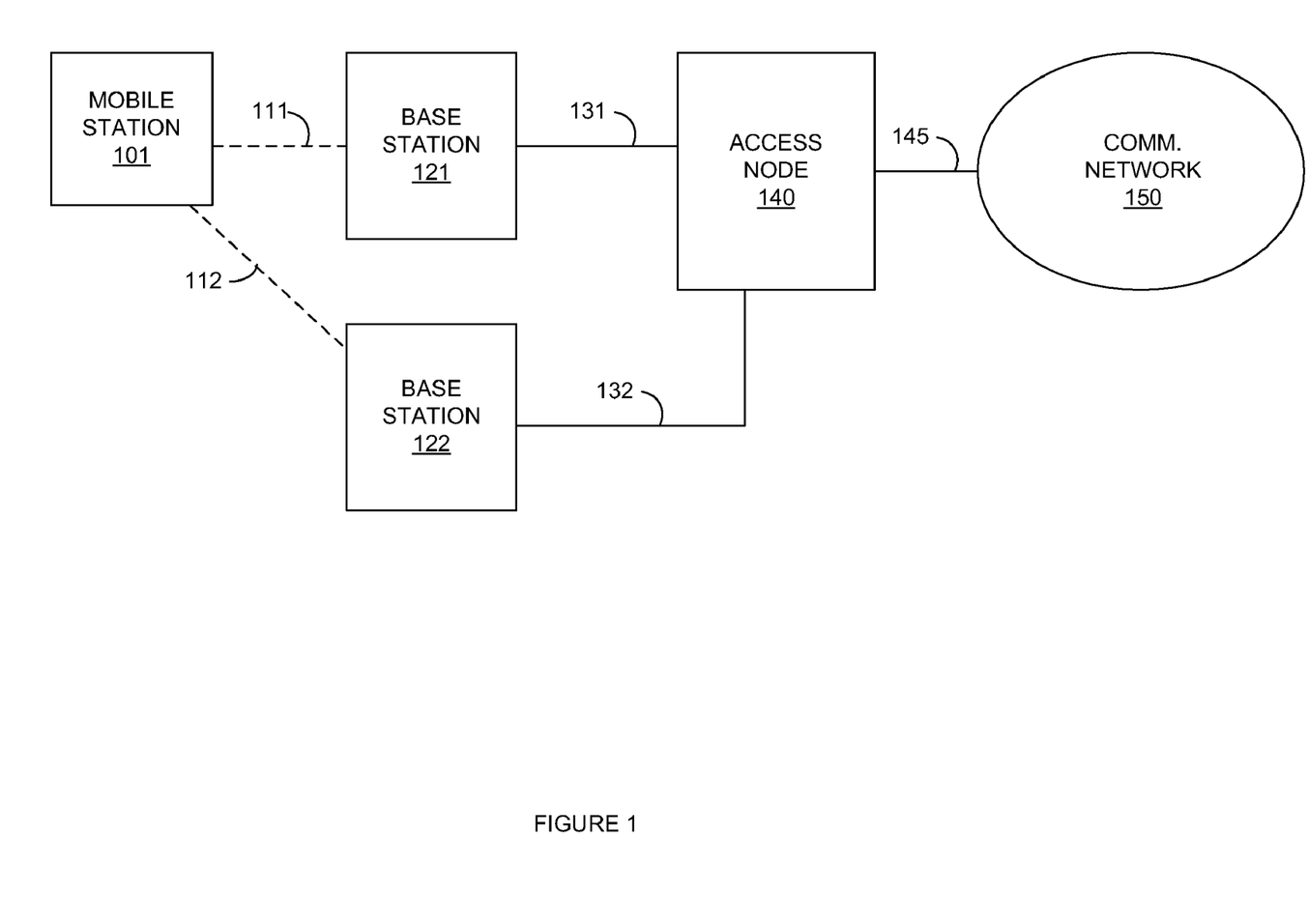
FIG. 1 is a block diagram of an exemplary embodiment for initiating handovers.

FIG. 1 is a block diagram of an exemplary embodiment whereby the condition of a backhaul link between the source base station and an access network is considered when determining if a handover should be initiated. FIG. 1 includes mobile station 101, base station 121, base station 122, access node 140, and communication network 150. Mobile station 101 communicates with base station 121 over wireless link 111. Similarly, mobile station 101 communicates with base station 122 over wireless link 112. Base station 121 communicates with access node 140 over backhaul link 131. Base station 122 communicates with access node 140 over backhaul link 132. Access node 140 communicates with communication network 150 over link 145.

Mobile station 101 comprises a mobile communication device capable of communicating with communication network 150 via base station 121, base station 122, and access node 140. Mobile phones, computers, personal digital assistants, music players, video players, and network interface cards are examples of mobile stations.

Base station 121 comprises a communication system capable of communicating with mobile station 101 over wireless link 111 and access node 140 over backhaul link 131. Base station 121 can also be referred to as a radio base station or a base transceiver station.

Base station 122 comprises a communication system capable of communicating with mobile station 101 over wireless link 112 and access node 140 over backhaul link 132. Base station 122 can also be referred to as a radio base station or a base transceiver station.

Access node 140 comprises a communication system capable of communicating with base station 121 over backhaul link 131 and base station 122 over backhaul link 132. Access node 140 is also capable of communicating with communication network 150.

Communication network 150 comprises any network or collection of networks, such as a wireless communication network, a public switched telephone network, and intranet, or an internet.

In operation, mobile station 101 exchanges communications with base station 121. In this embodiment, base station 121 is considered the source base station. The communications are exchanged in accordance with a wireless communications protocol, such as code division multiple access (CDMA), CDMA 2000, general service mobile (GSM), Wireless Fidelity (WiFi), World Wide Interoperability for Mobile Access (WiMAX), or any combination or variation thereof. Other mobile stations (not shown) also exchange communications with base station 121. Base station 121 exchanges the communications with access node 140 over backhaul link 131. Backhaul link 131 comprises a T-1 link, an Ethernet link, or other type of backhaul link. Access node 140 exchanges the communications with communication network 150.

Figure 2:
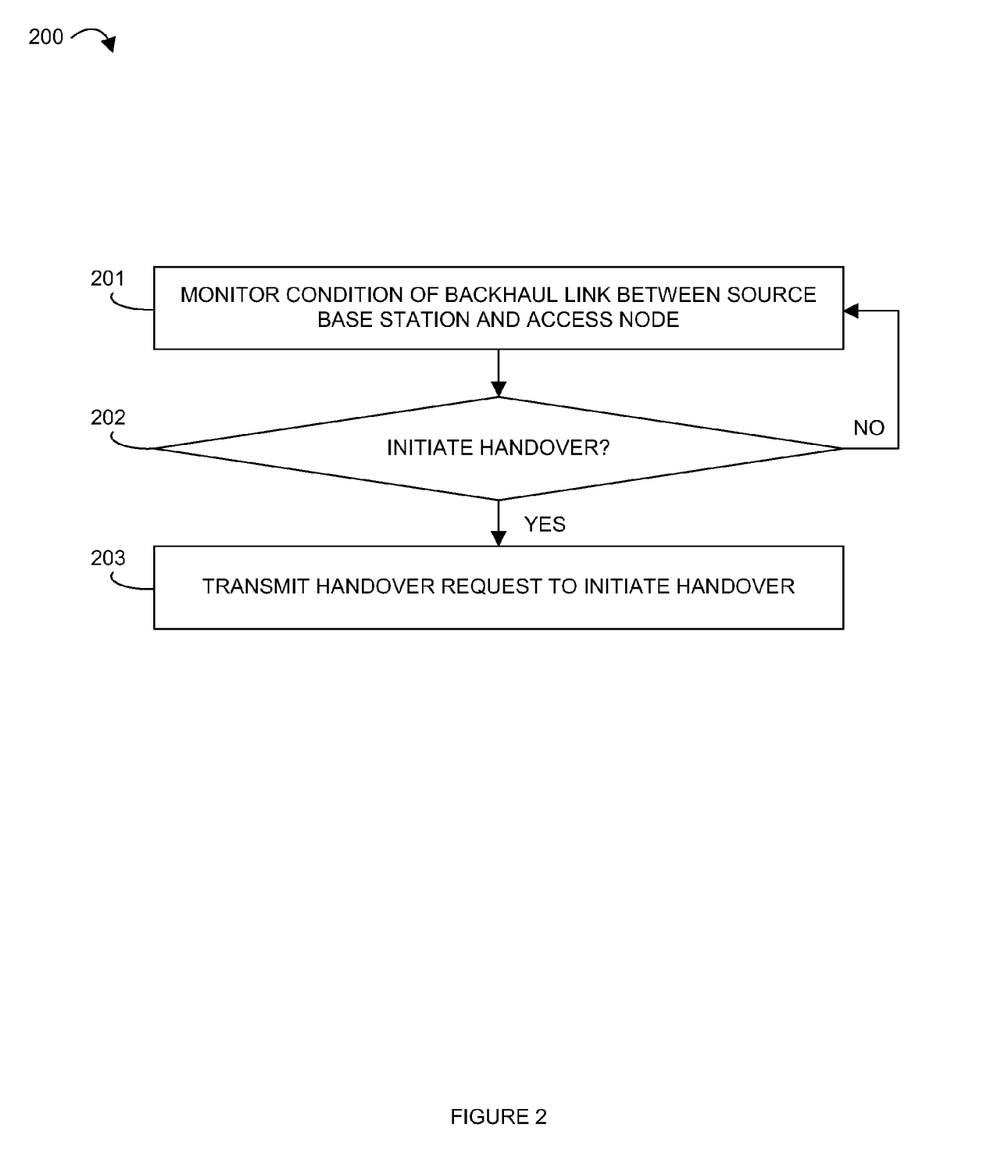
FIG. 2 illustrates a process for initiating handovers in an exemplary embodiment.

At times, backhaul link 131, between base station 141 and access node 140, may near full capacity. Such congestion could degrade the performance of the communication network. To avoid performance degradation, a handover of one or more of the mobile stations communicating with base station 131, including mobile station 101, could be initiated based on the condition of backhaul link 131. The handover would advantageously reduce the load on backhaul link 131. FIG. 2 illustrates a process 200 that may be employed to determine if the handover should be initiated. It should be noted that process 200 could be employed by a variety of different elements shown in FIG. 1, including mobile station 101, base station 121 or 122, or access node 140, or any combination thereof.

To begin, the condition of the backhaul link between the source base station 121 and access node 140 is monitored (201). The condition of backhaul link 131 is processed to determine if a handover should be initiated (202). If so, a handover request is transmitted to initiate the handover (203). If not, the step of monitoring the condition of the backhaul link (201) is repeated.

In the event that the handover should be initiated, the handover request triggers a handover process to move mobile station 101 from source base station 121, to a target base station. In this embodiment, base station 122 is assumed to be the target base station.

After the handover is complete, mobile station 101 exchanges communications with target base station 122 in accordance with a communications protocol, such as CDMA, CDMA 2000, GSM, WiFi, WiMAX, or any combination or variation thereof. Target base station 122 exchanges the communications over a new backhaul link 132 between target base station 122 and access node 140. Backhaul link 132 could comprise a T-1 or Ethernet link, or some other type of backhaul link. Access node 140 exchanges the communications with communication network 150. In this manner, the burden on the initial backhaul link 131 between source base station 121 and access node 140 is reduced and performance degradation due to reduced capacity on the initial backhaul link 131 is avoided.

Figure 3:
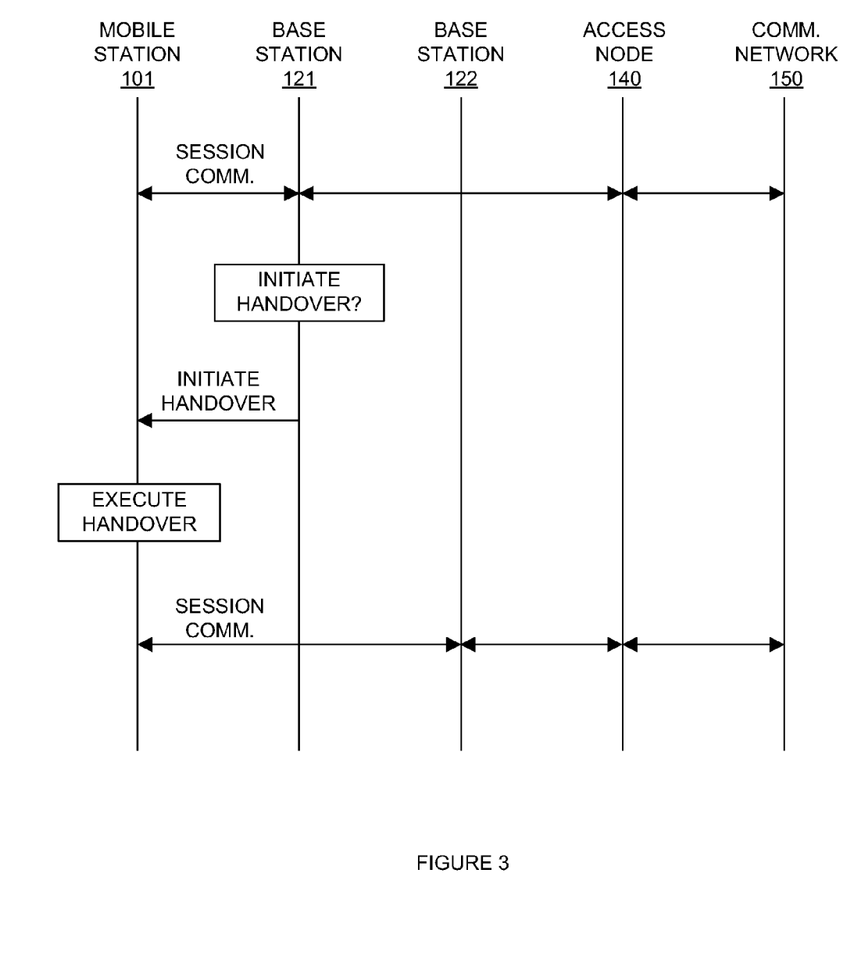
FIG. 3 is a flow diagram that describes initiating handovers in an exemplary embodiment.

FIG. 3 illustrates a flow diagram that describes an embodiment whereby process 200, as shown in FIG. 2, is employed by base station 121. In operation, mobile station 101 exchanges session communications with base station 121. The session communications comprise voice, video, or data communications. Other mobile stations (not shown) also exchange communications with base station 121. Base station 121 exchanges the communications with access node 140 over backhaul link 131. Access node 140 exchanges the communications with communication network 150.

Backhaul link 131 may near full capacity, potentially degrading network performance. To avoid performance degradation, a handover of one or more of the mobile stations communicating with base station 121 could be initiated based on the condition of backhaul link 131. The handover would reduce the load on backhaul link 131.

In this embodiment, base station 121 employs process 200 to determine whether or not to initiate a handover of mobile station 101 to base station 122. During operation, base station 121 monitors the condition of backhaul link 131 to determine if a handover should be initiated. The link condition comprises the available capacity of backhaul link 131 or the present load on backhaul link 131, as well as other conditions of backhaul link 131. In an example, base station 121 processes the link condition with criteria to determine if the condition satisfies the criteria. If the link condition meets the criteria, the handover is initiated. If the condition does not meet the criteria, base station 121 continues to monitor the condition of backhaul link 131.

If it is determined that the handover should be initiated, base station 121 transmits a handover request to mobile station 101 to initiate the handover. Mobile station 101 executes the handover in response to the request message. After the handover is complete, mobile station 101 exchanges communications with base station 122 in accordance with a communications protocol. Base station 122 exchanges the communications over backhaul link 132 with access node 140. Access node exchanges the communications with communication network 150.

Figure 4:
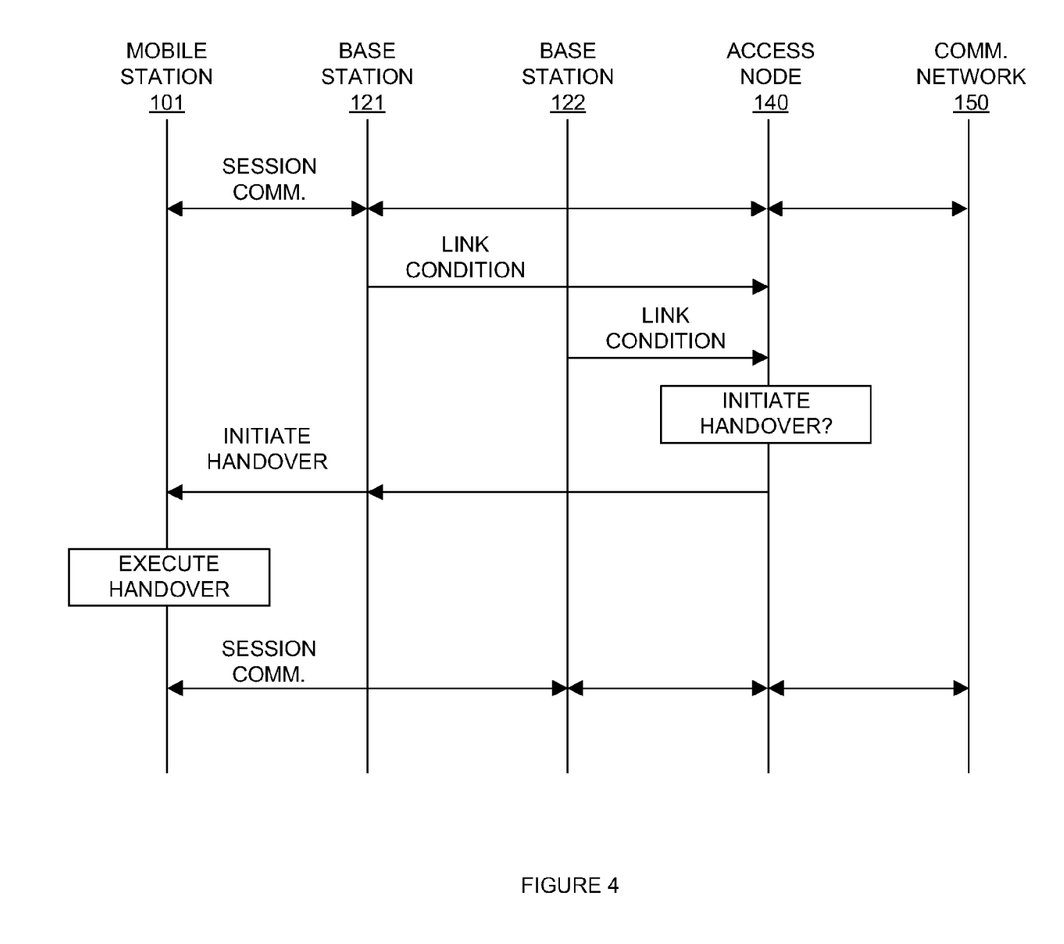
FIG. 4 is a flow diagram that describes initiating handovers in an exemplary embodiment.

FIG. 4 illustrates a flow diagram that describes another embodiment whereby process 200 is employed by access node 140. In this embodiment, access node 140 receives and processes the condition of backhaul links 131 and 132 to determine if a handover of mobile station 101 from base station 121 to base station 122 should be initiated.

As shown in FIG. 4, mobile station 101 exchanges session communications with base station 121. The session communications comprise voice, video, or data communications. Base station 121 exchanges the communications with access node 140 over backhaul link 131. Access node 140 exchanges the communications with communication network 150.

Referring still to FIG. 4, base station 121 transmits the condition of backhaul link 131 to access node 140. Likewise, base station 122 transmits the condition of backhaul link 132 to access node 140. It should be understood that base stations 121 and 122 need not transmit the link conditions to access node 140. Rather, access node 140 could itself monitor backhaul links 131 and 132 to determine the condition of each backhaul link.

Access node 140 processes the condition of backhaul link 131 to determine if backhaul link 131 is nearing full capacity, potentially degrading the performance of the network. The link condition comprises the available capacity of backhaul link 131, the present load on backhaul link 131, or some other condition of backhaul link 131. Access node 140 processes the link condition with criteria to determine if the condition satisfies the criteria. If the link condition meets the criteria, the handover is initiated. If the condition does not meet the criteria, access node 140 continues to monitor the condition of backhaul link 131.

Upon determining that the handover should be initiated, access node 140 transmits a handover request to mobile station 101 to initiate the handover. Mobile station 101 executes the handover in response to the request message. After the handover is complete, mobile station 101 exchanges communications with base station 122. Base station 122 exchanges the communications over backhaul link 132 with access node 140. Access node exchanges the communications with communication network 150.

Figure 5:
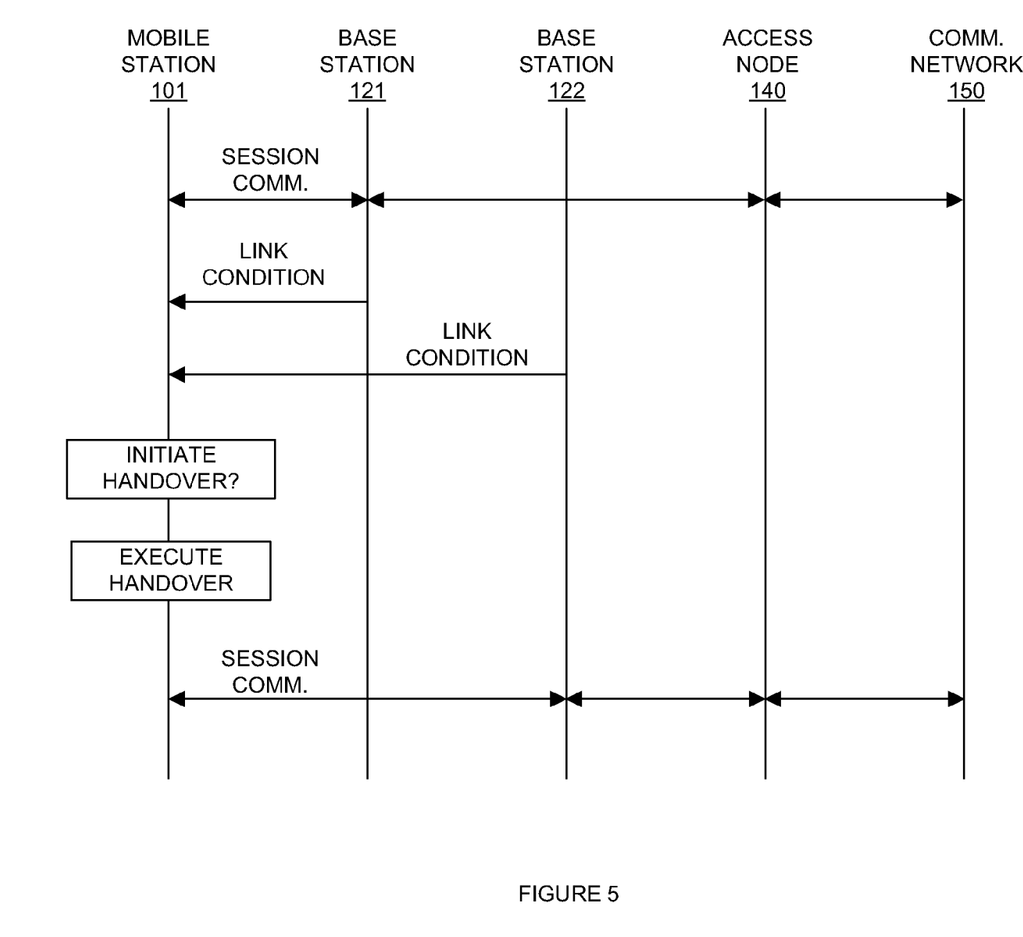
FIG. 5 is a flow diagram that describes initiating handovers in an exemplary embodiment.

FIG. 5 illustrates a flow diagram that describes yet another embodiment whereby process 200 is employed by mobile station 101. In this embodiment, mobile station 101 receives and processes the condition of backhaul links 131 and 132 to determine if a handover of mobile station 101 from base station 121 to base station 122 should be initiated.

As shown in FIG. 5, mobile station 101 exchanges session communications with base station 121. The session communications comprise voice, video, or data communications. Base station 121 exchanges the communications with access node 140 over backhaul link 131. Access node 140 exchanges the communications with communication network 150.

Continuing with FIG. 5, base station 121 transmits the condition of backhaul link 131 to mobile station 101. Likewise, base station 122 transmits the condition of backhaul link 132 to mobile station 101. It should be understood that base stations 121 and 122 need not transmit the link conditions to mobile station 101. In one option, base station 121 and base station 121 could transmits the link conditions to access node 140. Mobile station 101 could then query access node 140 for the link conditions. In another option, access node 140 could monitor the condition of backhaul link 131 and backhaul link 132. In such a case, mobile station 101 could query access node 140 for the link conditions. In yet another option, mobile station 101 could itself monitor the condition of backhaul links 131 and 132 by, for example, transmitting test messages to access node 140 or communication network 150.

Mobile station 101 processes the condition of backhaul link 131 to determine if backhaul link 131 is nearing full capacity, potentially degrading network performance. The link condition comprises the available capacity of backhaul link 131, the present load on backhaul link 131, or some other condition of backhaul link 131. Mobile station 101 processes the link condition with criteria to determine if the condition satisfies the criteria. If the link condition meets the criteria, the handover is initiated. If the condition does not meet the criteria, mobile station 101 continues to monitor the condition of backhaul link 131.

In the event that the handover should be initiated, mobile station 101 executes the handover in response to the request message. After the handover is complete, mobile station 101 exchanges communications with base station 122. Base station 122 exchanges the communications over backhaul link 132 with access node 140. Access node exchanges the communications with communication network 150.

Figure 6:
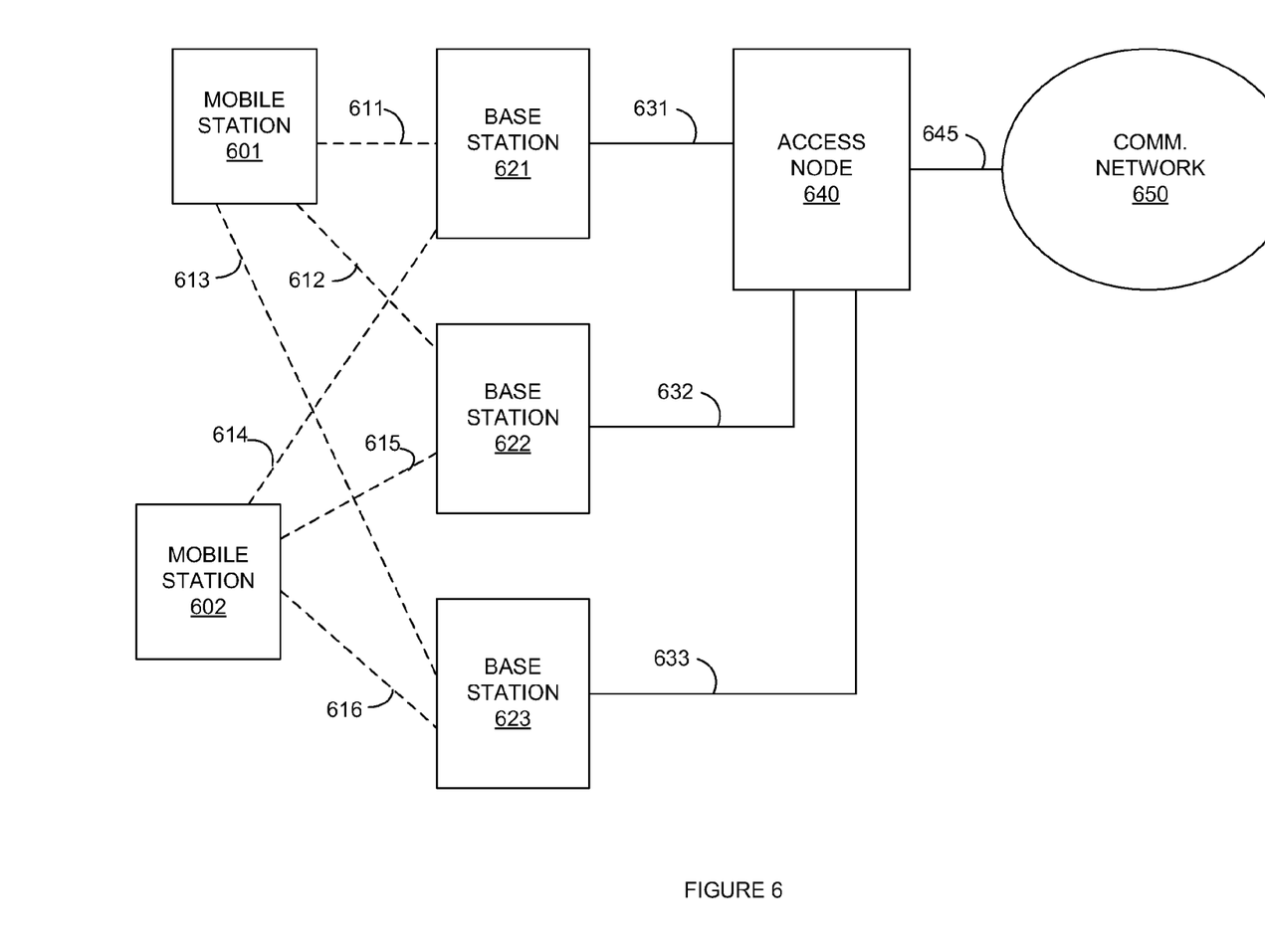
FIG. 6 is a block diagram of an exemplary embodiment for initiating handovers.

FIG. 6 is a block diagram that illustrates another exemplary embodiment. FIG. 6 includes mobile station 601, mobile station 602, base station 621, base station 622, base station 623, access node 640, and communication network 650. Mobile stations 601 and 602 communicate with base station, base station 622, and base station 623. Base station 621 communicates with access node 640 over backhaul link 631. Base station 622 communicates with access node 640 over backhaul link 632. Base station 623 communicates with access node 640 over backhaul link 633. Access node 640 is in communication with communication network 650 over communication link 645.

Mobile station 601 comprises a mobile device capable of communicating with base stations 621, 622, and 623 to access services provided communication network 650. Examples of services are voice, video, and data services. Mobile phones, computers, personal digital assistants, music players, video players, and network interface cards are examples of mobile stations. Mobile station 602 also comprises a mobile device capable of communicating with base stations 621, 622, and 623 to access services provided by communication network 650.

Base stations 621, 622, and 623 comprise communication systems capable of communicating with mobile stations 601 and 602 over wireless links 611-616. Base stations 621, 622, an 623 are further capable of communicating with access node 640 over backhaul links 631, 632, and 633 respectively. Base stations 621, 622, and 623 can also be referred to as radio base stations or base transceiver stations.

Access node 640 comprises a communication system capable of communicating with base stations 621, 622, and 623 over backhaul links 631, 632, and 633 respectively. Access node 640 is also capable of communicating with communication network 650.

Communication network 650 comprises any network or collection of networks, such as a wireless communication network, a public switched telephone network, an intranet, or an internet.

As shown in FIG. 6, mobile station 601 is in communication with base station 621 over wireless link 611, with base station 622 over wireless link 612, and with base station 623 over wireless link 613. It should be understood that mobile station 601 is capable of exchanging user communications and control communications with base stations 621, 622, and 623 over wireless links 611, 612, and 613 respectively. Communications are exchanged over wireless links 611, 612, and 613 in accordance with wireless communication protocols, such as CDMA, CDMA 2000, GSM, WiFi, WiMAX, or any combination or variation thereof.

As further shown in FIG. 6, mobile station 602 is in communication with base station 621 over wireless link 614, with base station 622 over wireless link 615, and with base station 623 over wireless link 616. It should be understood that mobile station 602 is capable of exchanging user communications and control communications with base stations 621, 622, and 623 over wireless links 614, 615, and 616 respectively. Communications are exchanged over wireless links 614, 615, and 616 in accordance with wireless communication protocols, such as CDMA, CDMA 2000, GSM, WiFi, WiMAX, or any combination or variation thereof.

In operation, base stations 621, 622, and 623 each transmit a pilot signal. The pilot signals are transmitted continuously by base stations 621, 622, and 623. Mobile station 601 acquires and processes the pilot signals of each base station 621, 622, and 623 to establish wireless links 611, 612, and 613. It should be understood that mobile station 601 could establish wireless links 611, 612, and 613 upon detecting each pilot signal. Alternatively, mobile station 601 could establish wireless links 611, 612, and 614 as needed.

Mobile station 601 maintains an active set of all the base stations within range for which mobile station 601 receives a pilot signal. It should be understood that, in some embodiments, mobile station 601 may share its active set with any of base stations 621, 622, or 623. In some embodiments, mobile station 601 may share its active set with access node 640.

Mobile station 601 selects one of base station 621, 622, or 623 as its source base station for originating and terminating sessions, such as voice, video, or data sessions. In this embodiment, it is assumed that base station 621 is the source base station.

Upon selecting a source base station, mobile station 601 establishes a session with communication network 650 via base station 621 and access node 640. The session comprises a voice, video, or data session. Mobile station 601 exchanges session communications with base station 621 over wireless link 611. Base station 621 exchanges the session communications with access node 640 over backhaul link 631. Access node exchanges the session communications with communication network 650 over communication link 645.

Further in operation, mobile station 602 acquires and processes the pilot signals of each base station 621, 622, and 623 to establish wireless links 614, 615, and 616. It should be understood that mobile station 602 could establish wireless links 614, 615, and 615 upon detecting each pilot signal. Alternatively, mobile station 602 could establish wireless links 614, 615, and 616 as needed.

Mobile station 602 maintains an active set of all the base stations within range for which mobile station 602 receives a pilot signal. It should be understood that, in some embodiments, mobile station 602 may share its active set with any of base stations 611, 612, or 613. In some embodiments, mobile station 601 may share its active set with access node 640.

Mobile station 602 selects one of base station 621, 622, or 623 as its source base station for originating and terminating sessions, such as voice, video, or data sessions. In this embodiment, it is assumed that base station 621 is the source base station.

Upon selecting a source base station, mobile station 602 establishes a session with communication network 650 via base station 621 and access node 640. The session comprises a voice, video, or data session. Mobile station 602 exchanges session communications with base station 621 over wireless link 611. Base station 621 exchanges the session communications with access node 640 over backhaul link 631. Access node exchanges the session communications with communication network 650 over communication link 645.

Backhaul link 631 may become congested at times, possibly degrading the performance of the network. For instance, congestion on backhaul link 631 could delay the exchange of communications between mobile station 601 and communication network 650, thereby introducing jitter and other undesirable effects. Under such circumstances, process 700, as shown in FIG. 7, is employed to mitigate or altogether avoid undesirable events on backhaul link 631, such as congestion.

Figure 7:
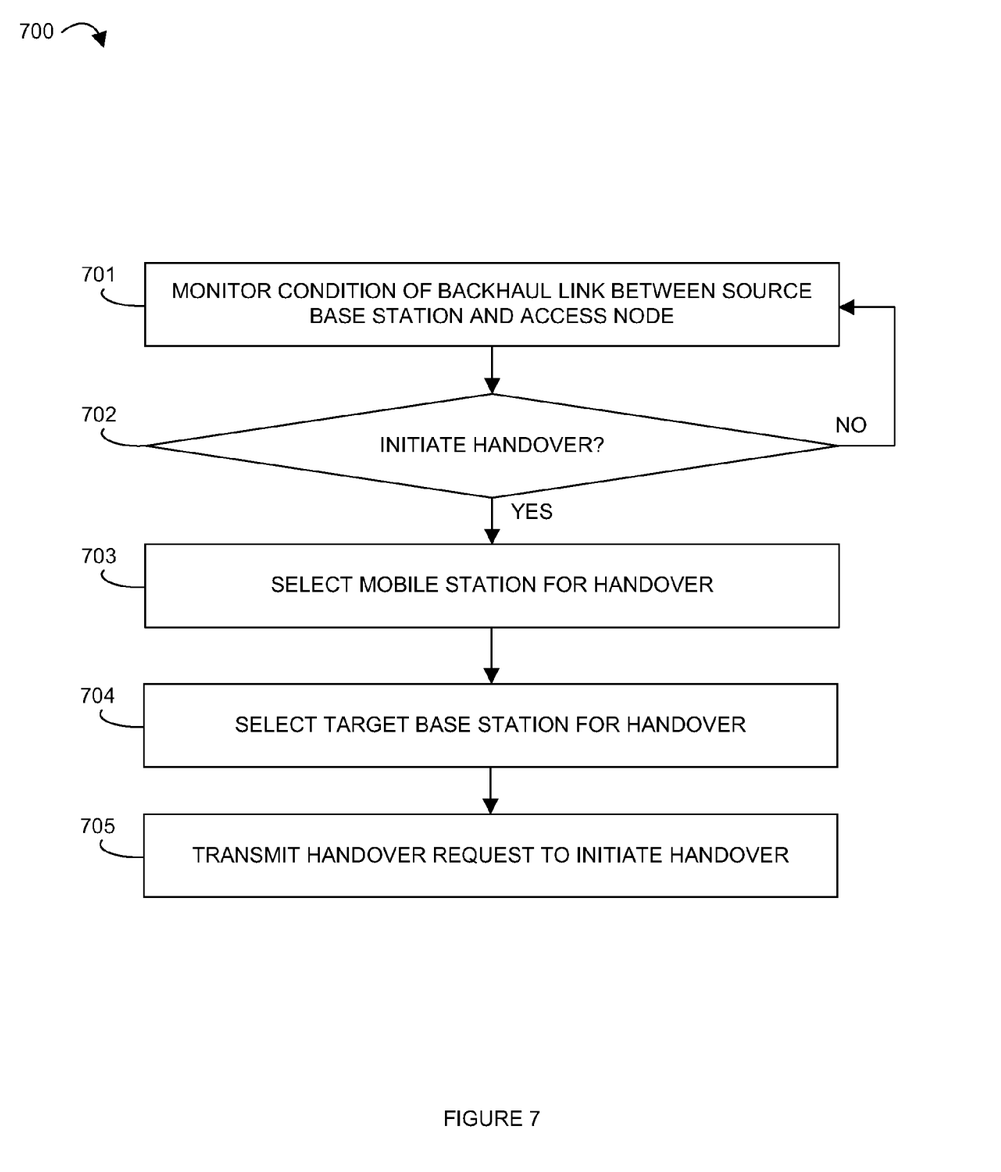
FIG. 7 illustrates a process for initiating handovers in an exemplary embodiment.

Referring to FIG. 7, the condition of the backhaul link 631 between base station 621 and access node 640 is monitored (701). The link condition comprises the present load of backhaul link 631, the available spare capacity of backhaul link 631, or the latency of backhaul link 631. The link condition could comprise other factors. The condition of backhaul link 631 is processed to determine if a handover of mobile station 601 to either of base station 622 or 623 should be initiated (702).

If it is determined that the handover should be initiated, a mobile station is selected for the handover (703). One of mobile station 601 or 602 could be selected based on a number of factors, such as the status of an application running on each mobile station or the type of communications exchanged by each mobile station. Other factors could also be considered.

In one example, a mobile station participating in a real-time session, such as a voice or video session, is assigned priority over a mobile station participating in a data session, such as web browsing. To avoid dropping the real-time session, the mobile station participating in the data session is selected for the handover.

In another example, an array of priorities are pre-determined to assist with selecting the appropriate mobile station for the handover. For instance, all real-time sessions could be assigned priority over non-real time sessions. Within this subset of real-time sessions, voice sessions could be assigned priority over streaming video or audio sessions. In this manner, mobile stations engaged in non-real time sessions will be selected for handovers before mobile stations engaged in real time sessions are selected. Likewise, mobile stations engaged in streaming video or audio sessions will be selected for handovers before mobile stations engaged in voice sessions are selected. It should be understood that the converse could occur. For instance, low priority sessions could be selected for handovers to poorly performing base stations in order to improve the performance delivered to higher priority sessions.

In another example, the status of the applications running on each mobile station is considered when selecting the appropriate mobile station for the handover. Deep packet inspection could be employed to determine the status of the applications. For instance, one mobile station may be engaged in a file transfer, such as a music download, while another mobile station may be engaged in web browsing. The status of the file transfer could be determined via deep packet inspection and the status considered when selecting the appropriate mobile station for the handover. Rather than handover a mobile station nearing the end of a file transfer, the mobile station engaged in web browsing could be selected instead.

In this embodiment, it is assumed that mobile station 601 is selected for the handover. Next, a target base station is selected from base station 622 or base station 623 (704). The target base station could be selected based on a number of factors, such as the quality of the RF link between each potential target base station and the selected mobile station. Additionally, the condition of the backhaul link between each potential target base station and access node 640 could be considered. In this embodiment, it is assumed that base station 622 is selected as the target base station.

Once the target base station is selected, a handover request is transmitted to initiate the handover. The handover of mobile station 601 from its source base station, base station 621, to the target base station, base station 622, is initiated in response to the handover request. Mobile station 601 ceases to exchange session communications with base station 621 and begins to exchange session communications with base station 622. Base station 622 exchanges the session communications with access node 640 over backhaul link 632, thereby alleviating traffic conditions on backhaul link 631.

It should be noted that the handover could be a soft handover, a hard handover, or an inter-technology handover. Other types or handovers are also possible. It should also be understood that process 700 could be employed by mobile station 601 or 602, base station 621, 622, or 633, or access node 640, or any combination thereof.

Figure 8:
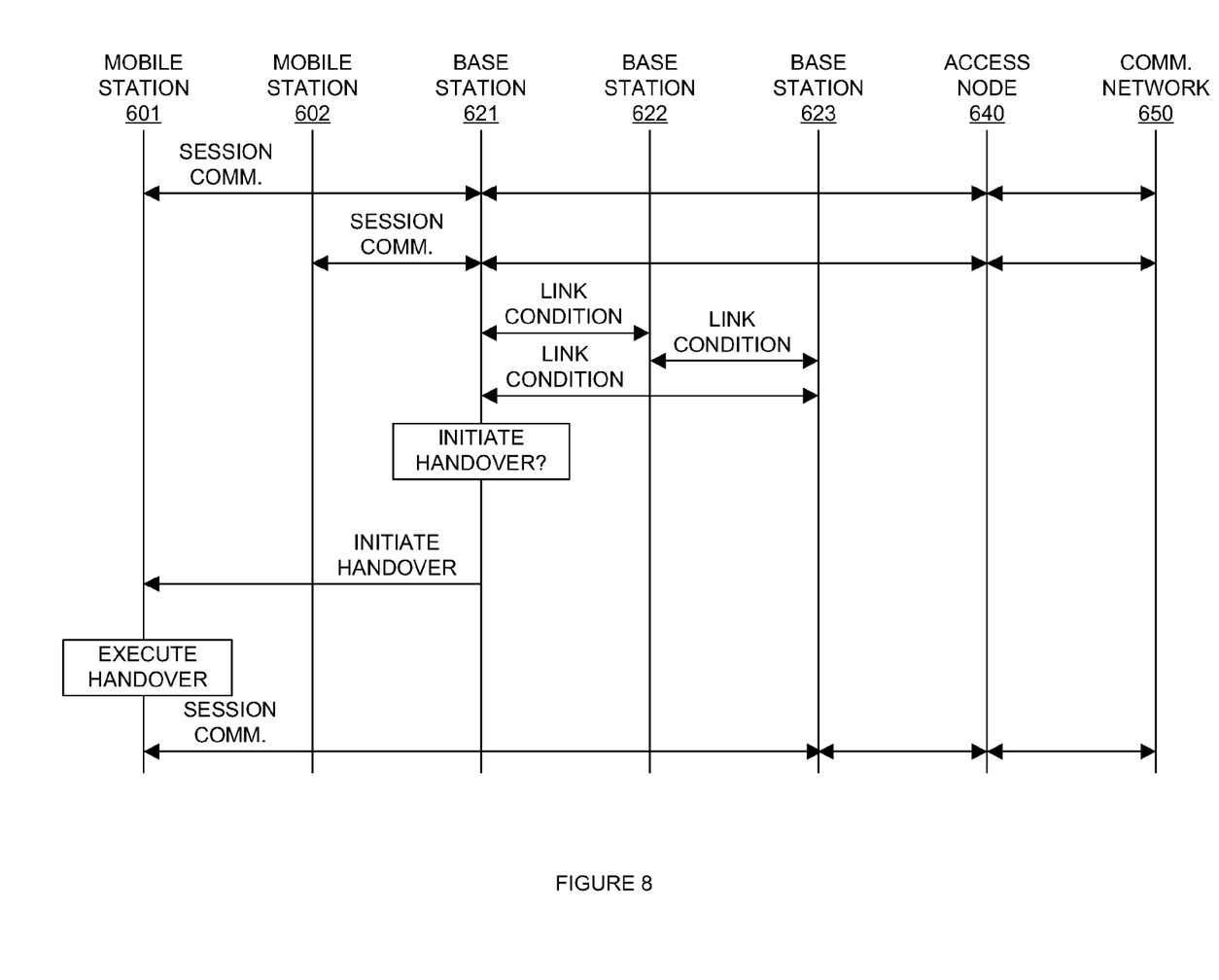
FIG. 8 is a flow diagram that describes initiating handovers in an exemplary embodiment.

FIG. 8 is a session flow diagram that illustrates one such example embodiment whereby process 700 is employed by base station 621.

As shown in FIG. 8, mobile station 601 exchanges session communications with base station 621 over wireless link 611. The session communications comprise voice, video, or data communications. Base station 621 exchanges the communications with access node 640 over backhaul link 631. Backhaul link 631 comprises a T-1, Ethernet, or other type of backhaul link. Access node 640 exchanges the communications with communication network 650.

As further illustrated in FIG. 8, mobile station 602 also exchanges session communications with base station 621 over wireless link 614. The session communications comprise voice, video, or data communications. Base station 621 exchanges the communications with access node 640 over backhaul link 631. Access node 640 exchanges the communications with communication network 650.

In operation, other communication devices (not shown) communicate with base stations 622 and base station 623. Further in operation, base station 621 monitors the condition of backhaul link 631. Likewise, base station 622 and base station 623 monitor the condition of backhaul link 632 and backhaul link 633 respectively. Base station 621 and base station 622 exchange information on the condition of backhaul link 631 and backhaul link 632. Similarly, base station 621 and base station 623 exchange information on the condition of backhaul link 631 and 633. Base station 622 and base station 623 also exchange information on the condition of backhaul link 632 and backhaul link 633. The link conditions exchanged between base stations comprises the available capacity of or the present load on each backhaul link, as well as other conditions of the backhaul links.

At times, backhaul link 631 may near full capacity, potentially degrading network performance. To avoid performance degradation, a handover of one or more of the mobile stations communicating with base station 621 could be initiated based on the condition of backhaul link 631. The handover would reduce the load on backhaul link 631.

In this embodiment, base station 621 employs process 700 to determine whether or not to initiate a handover of one of mobile stations 601 and 602 to one of base station 622 or base station 623. In addition, base station 621 selects which mobile station 601 or 602 to handover.

To begin, base station 621 monitors the condition of the backhaul link 631 between base station 621 and access node 640. The link condition comprises the present load of backhaul link 631, the available spare capacity of backhaul link 631, the latency of backhaul link 631, or other factors. Base station 621 processes the condition of backhaul link 631 to determine if a handover of mobile station 601 to either of base station 622 or 623 should be initiated.

In some embodiments, base station 621 also processes the condition of backhaul links 632 and 633 to determine if either link has sufficient spare capacity. If both backhaul link 632 and backhaul link 633 lack sufficient spare capacity, then base station 621 refrains from initiating a handover. However, if either one of backhaul link 632 or 633 has sufficient spare capacity, then base station 621 proceeds to select the appropriate mobile station for the handover.

If it is determined that the handover should be initiated, base station 621 selects a mobile station for the handover. Base station 621 could select one of mobile station 601 or 602 could be selected based on a number of factors, such as the status of an application running on each mobile station or the type of communications exchanged by each mobile station. Other factors could also be considered.

In this embodiment, it is assumed that base station 621 selects mobile station 601 for the handover. Next, base station 621 selects a target base station from base station 622 or base station 623. The target base station could be selected based on a number of factors, such as the quality of the RF link between each potential target base station and the selected mobile station. Additionally, the condition of the backhaul link between each potential target base station and access node 640 could be considered. In this embodiment, it is assumed that base station 622 is selected as the target base station. In some embodiments, base station 621 could indicate a preferred target base station based on which backhaul link 632 or 633 has sufficient spare capacity. In other embodiments, base station 621 could provide the link condition information to mobile station 601. In such a case, mobile station 601 could select the target base station based on the link condition information.

Once the target base station is selected, base station 621 transmits a handover request to mobile station 601 to initiate the handover. The handover of mobile station 601 from its source base station, base station 621, to the target base station, base station 622, is initiated in response to the handover request. Mobile station 601 ceases to exchange session communications with base station 621 and begins to exchange session communications with base station 622. Base station 622 exchanges the session communications with access node 640 over backhaul link 632, thereby alleviating traffic conditions on backhaul link 631.

It should be noted that the handover could be a soft handover, a hard handover, or an inter-technology handover. Other types or handovers are also possible. It should also be understood that process 700 could be employed by mobile station 601 or 602, base station 621, 622, or 633, or access node 640, or any combination.

Figure 9:
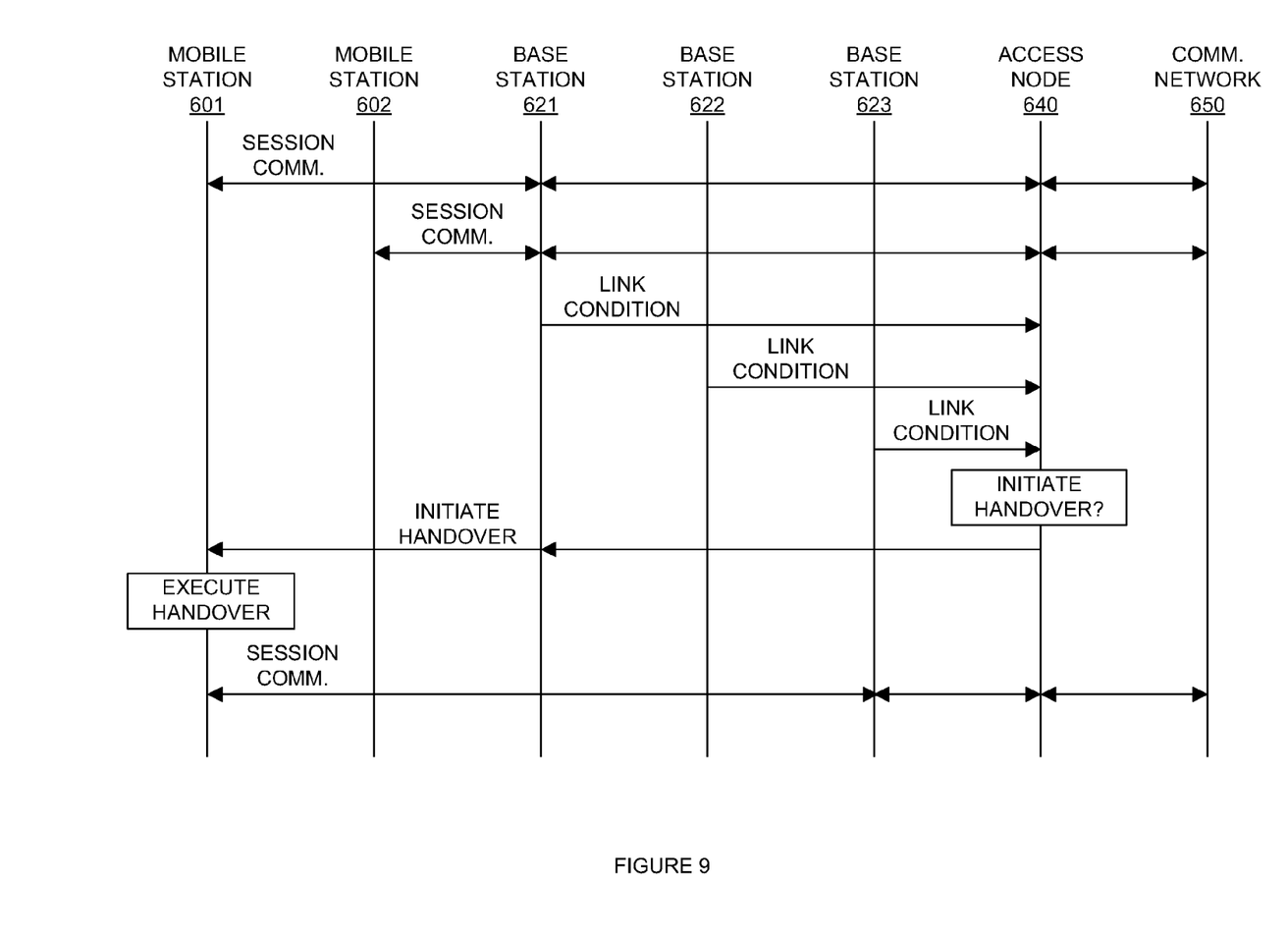
FIG. 9 is a flow diagram that describes initiating handovers in an exemplary embodiment.

FIG. 9 is another flow diagram that illustrates an embodiment whereby process 700 is employed by access node 640.

As shown in FIG. 9, mobile station 601 exchanges session communications with base station 621 over wireless link 611. The session communications comprise voice, video, or data communications. Base station 621 exchanges the communications with access node 640 over backhaul link 631. Access node 640 exchanges the communications with communication network 650.

As further illustrated in FIG. 9, mobile station 602 also exchanges session communications with base station 621 over wireless link 614. The session communications comprise voice, video, or data communications. Base station 621 exchanges the communications with access node 640 over backhaul link 631. Access node 640 exchanges the communications with communication network 650.

In operation, other communication devices (not shown) communicate with base stations 622 and base station 623. Further in operation, base station 621 monitors the condition of backhaul link 631. Likewise, base station 622 and base station 623 monitor the condition of backhaul link 632 and backhaul link 633 respectively. Base station 621, base station 622, and base station 623 transfer the condition of each link to access node 640. The link conditions exchanged between base stations comprises the available capacity of or the present load on each backhaul link, as well as other conditions of the backhaul links.

At times, backhaul link 631 may near full capacity, potentially degrading network performance. To avoid performance degradation, a handover of one or more of the mobile stations communicating with base station 621 could be initiated based on the condition of backhaul link 631. The handover would reduce the load on backhaul link 631.

In this embodiment, access node 640 employs process 700 to determine whether or not to initiate a handover of one of mobile stations 601 and 602 to one of base station 622 or base station 623. In addition, access node 640 may select which mobile station 601 or 602 to handover.

Further in operation, access node 640 monitors the condition of backhaul link 631 to determine if a handover should be initiated. In an example, access node 640 processes the condition of each backhaul link 631, 632, and 633 to determine if the condition satisfies the criteria. If the link conditions meet the criteria, the handover is initiated. If the link conditions do not meet the criteria, the handover is not initiated.

In some embodiments, access node 640 first processes the condition of backhaul link 631 to determine if the available capacity of backhaul link 631 has fallen below a threshold amount. If so, access node 640 processes the condition of backhaul links 632 and 633 to determine if either link has sufficient spare capacity. If both backhaul link 632 and backhaul link 633 lack sufficient spare capacity, then access node 640 refrains from initiating the handover. However, if either one of backhaul link 632 633 has sufficient spare capacity, then access node 640 proceeds to select a mobile station for the handover and a target base station.

The target base station could be selected based on a number of factors, such as the quality of the RF link between each potential target base station and the selected mobile station. Additionally, the condition of the backhaul link between each potential target base station and access node 640 could be considered. In this embodiment, it is assumed that base station 622 is selected as the target base station.

Access node 640 could also select one of mobile station 601 or 602 based on a number of factors, such as the status of an application running on each mobile station or the type of communications exchanged by each mobile station. Other factors could also be considered. In this embodiment, it is assumed that mobile station 601 is selected for the handover.

Upon selecting the appropriate mobile station and the target base station, access node 640 transmits a handover request to mobile station 601 to initiate the handover. In some embodiments, access node 640 could indicate a preferred target base station based on which backhaul link 632 or 633 has sufficient spare capacity. In other embodiments, access node 640 could provide the link condition information to mobile station 601. In such a case, mobile station 601 could select the target base station based on the link condition information.

Mobile station 601 executes the handover in response to the request message. In this example, base station 623 is selected as the target base station. After the handover is complete, mobile station 601 exchanges communications with base station 623. Base station 623 exchanges the communications over backhaul link 633 with access node 640. Access node 640 exchanges the communications with communication network 650. In this manner, the load on backhaul link 631 is reduced.

Figure 10:
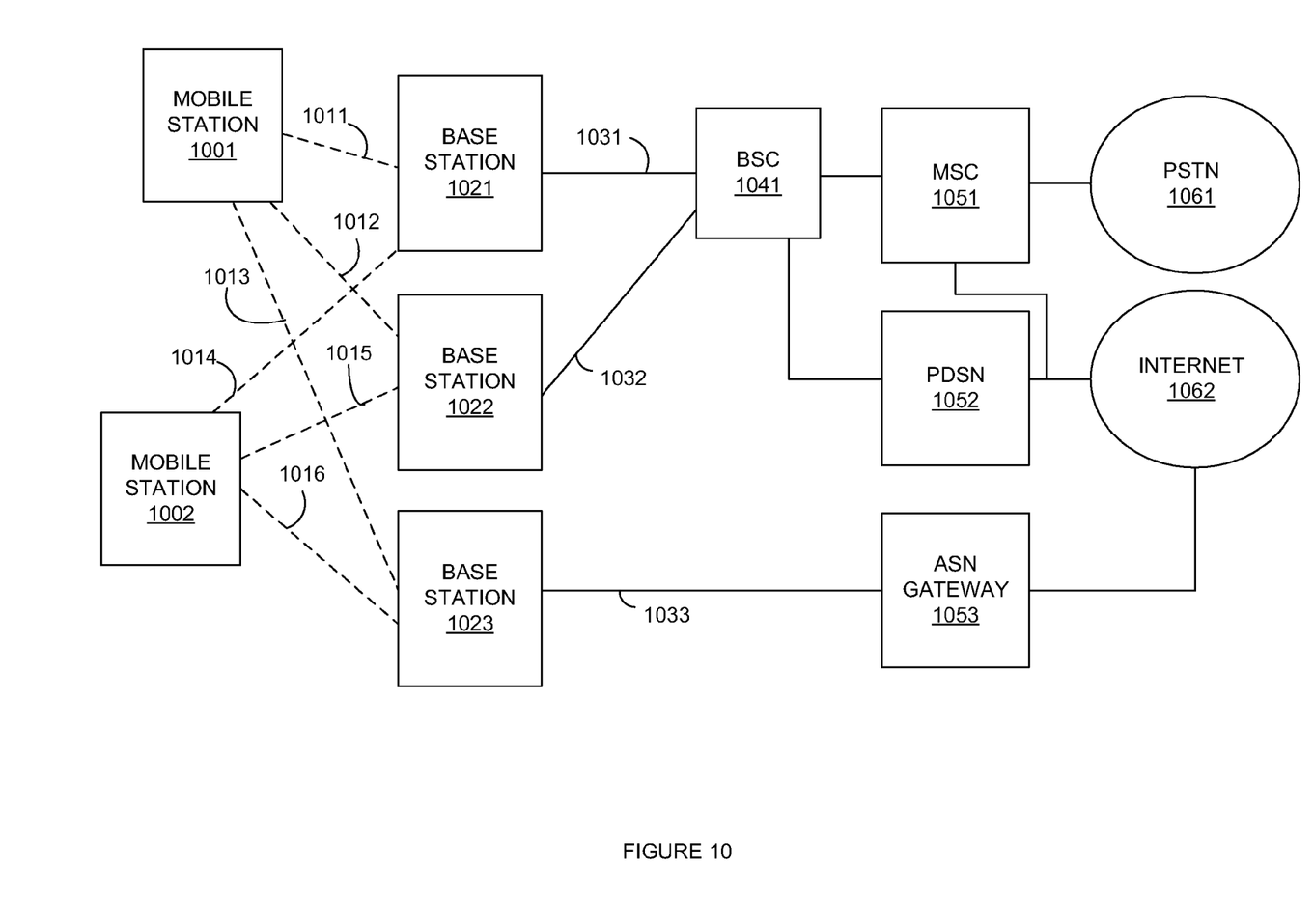
FIG. 10 is a block diagram of an exemplary embodiment for initiating handovers.

FIG. 10 is a block diagram of another exemplary embodiment. FIG. 10 includes mobile station 1001, mobile station 1002, base station 1021, base station 1022, base station 1023, base station 1041, base station controller (BSC) 1041, mobile switching center (MSC) 1051, packet data switching node (PDSN) 1052, access service network (ASN) gateway 1053, public switched telephone network 1061, and Internet 1062.

Mobile station 1001 comprises a mobile device capable of communicating with base stations 1021, 1022, and 1023 to access services provided by PSTN 1061 and Internet 1062 in accordance with multiple wireless communication protocols. Mobile station 1002 also comprises a mobile device capable of communicating with base stations 1021, 1022, and 1023 to access services provided by PSTN 1061 and Internet 1062 in accordance with multiple wireless communication protocols. Examples of services are voice, video, and data services. Mobile phones, computers, personal digital assistants, music players, video players, and network interface cards are examples of mobile stations. Examples of wireless communication protocols are CDMA, CDMA2000, W-CDMA, EVDO, 1xRTT, GSM, WiFi, or WiMAX.

Mobile station 1001 communicates with base station 1021 over wireless link 1011, with base station 1022 over wireless link 1012, and with base station 1023 over wireless link 1013. Mobile station 1001 communicates with base stations 1021 and 1022 in accordance with a wireless communication protocol diverse from the wireless protocol used by mobile station 1001 to communicate with base station 1023.

Likewise, mobile station 1002 communicates with base station 1021 over wireless link 1014, with base station 1022 over wireless link 1015, and with base station 1023 over wireless link 1016. Mobile station 1002 communicates with base stations 1021 and 1022 in accordance with a wireless communication protocol diverse from the wireless protocol used by mobile station 1002 to communicate with base station 1023.

Base station 1021 communicates with BSC 1041 over backhaul link 1031. Base station 1022 communicates with BSC 1041 over backhaul link 1032. Base station 1023 communicates with ASN gateway 1053 over backhaul link 1033. Base station 1041 is in communication with MSC 1051 and PDSN 1052. MSC 1051 is in communication with PSTN 1061. PDSN is in communication with Internet 1062. ASN gateway 1053 is in communication with Internet 1062.

In operation, base stations 1021, 1022, and 1023 each transmit a pilot signal. The pilot signals are transmitted continuously by base stations 1021, 1022, and 1023. Mobile station 1001 acquires and processes the pilot signals of each base station 1021, 1022, and 1023 to establish wireless links 1011, 1012, and 1013. It should be understood that mobile station 1001 could establish wireless links 1011, 1012, and 1013 upon detecting each pilot signal. Alternatively, mobile station 1001 could establish wireless links 1011, 1012, and 1014 as needed.

Mobile station 1001 maintains an active set of all the base stations within range for which mobile station 1001 receives a pilot signal. It should be understood that, in some embodiments, mobile station 1001 may share its active set with any of base stations 1021, 1022, or 1023. In some embodiments, mobile station 1001 may share its active set with BSC 1041 or ASN gateway 1053.

Mobile station 1001 selects one of base station 1021, 1022, or 1023 as its source base station for originating and terminating sessions, such as voice, video, or data sessions. In this embodiment, it is assumed that base station 1021 is the source base station.

Upon selecting a source base station, mobile station 1001 establishes a communication session with Internet 1062 via base station 1021, BSC 1041, and PDSN 1052. The session comprises a voice, video, or data session. Mobile station 1001 exchanges session communications with base station 1021 over wireless link 1011. Base station 1021 exchanges the session communications with BSC 1041 over backhaul link 1031. Backhaul link 1031 comprises a T-1, Ethernet, or other type of backhaul link. BSC 1041 exchanges the session communications PDSN 1052, and PDSN 1052 exchanges the communications with Internet 1062.

Further in operation, mobile station 1002 acquires and processes the pilot signals of each base station 1021, 1022, and 1023 to establish wireless links 1014, 1015, and 1016. It should be understood that mobile station 1002 could establish wireless links 1014, 1015, and 1015 upon detecting each pilot signal. Alternatively, mobile station 1002 could establish wireless links 1014, 1015, and 1016 as needed.

Mobile station 1002 maintains an active set of all the base stations within range for which mobile station 1002 receives a pilot signal. It should be understood that, in some embodiments, mobile station 1002 may share its active set with any of base stations 1011, 1012, or 1013. In some embodiments, mobile station 1001 may share its active set with BSC 1041 or ASN gateway 1053.

Mobile station 1002 selects one of base station 1021, 1022, or 1023 as its source base station for originating and terminating sessions, such as voice, video, or data sessions. In this embodiment, it is assumed that base station 1021 is the source base station.

Upon selecting a source base station, mobile station 1002 establishes a session with Internet 1062 via BSC 1041 and PDSN 1052. The session comprises a voice, video, or data session. Mobile station 1002 exchanges session communications with base station 1021 over wireless link 1014. Base station 1021 exchanges the session communications with BSC 1041 over backhaul link 1031. BSC 1041 exchanges the session communications with Internet 1062 via PDSN 1052.

Further in operation, other communication devices (not shown) communicate with base stations 1022 and base station 1023. Base station 1021 monitors the condition of backhaul link 1031. Likewise, base station 1022 and base station 1023 monitor the condition of backhaul link 1032 and backhaul link 1033 respectively. Base station 1021 and base station 1022 exchange information on the condition of backhaul link 1031 and backhaul link 1032. Similarly, base station 1021 and base station 1023 exchange information on the condition of backhaul link 1031 and 1033. Base station 1022 and base station 1023 also exchange information on the condition of backhaul link 1032 and backhaul link 1033. The link conditions exchanged between base stations comprises the available capacity of or the present load on each backhaul link, as well as other conditions of the backhaul links.

Backhaul link 1031 may near full capacity, potentially degrading performance. To avoid performance degradation, a handover of one or more of the mobile stations communicating with base station 1021 could be initiated based on the condition of backhaul link 1031. The handover would reduce the load on backhaul link 1031.

In this embodiment, base station 1021 employs a process to determine whether or not to initiate a handover of one of mobile stations 1001 and 1002 to one of base station 1022 or base station 1023. In addition, base station 1021 must select which mobile station 1001 or 1002 to handover.

Further in operation, base station 1021 monitors the condition of backhaul link 1031 to determine if a handover should be initiated. In an example, base station 1021 processes the condition of each backhaul link 1031, 1032, and 1033 to determine if the condition satisfies the criteria. If the link conditions meet the criteria, the handover is initiated. If the link conditions do not meet the criteria, the handover is not initiated.

In some embodiments, base station 1021 first processes the condition of backhaul link 1031 to determine if the available capacity of backhaul link 1031 has fallen below a threshold amount. If so, base station 1021 processes the condition of backhaul links 1032 and 1033 to determine if either link has sufficient spare capacity. If both backhaul link 1032 and backhaul link 1033 lack sufficient spare capacity, then base station 1021 refrains from initiating the handover. However, if either one of backhaul link 1032 1033 has sufficient spare capacity, then base station 1021 proceeds to select the appropriate mobile station for the handover.

In order to select the appropriate mobile station for the handover, base station 1001 may consider several factors, such as the geographical proximity of each mobile station to each base station, the type of application or applications running on each mobile station, or the status of a particular application running on each mobile station, as well as other factors.

In an example, base station 1001 monitors the status of a download running on one of the mobile stations. Base station 1001 could independently determine the status of the download via deep packet inspection of a traffic stream associated with the download. Alternatively, base station 1001 could receive a status message from the mobile station that indicates the status of the download. The status could indicate the present phase of the download, such as ⅓ complete, ⅔ complete, or nearly entirely complete.

In this example, it is assumed that base station 1021 has selected mobile station 1001 for the handover. Base station 1021 transmits a handover request to mobile station 1001 to initiate the handover. In some embodiments, base station 1021 could indicate a preferred target base station based on which backhaul link 1032 or 1033 has sufficient spare capacity. For instance, base station 1021 could maintain an active set of base stations for mobile station 1001 and could select one of one of base station 1022 or 1023 from the active set. In other embodiments, base station 1021 could provide the link condition information to mobile station 1001. In such a case, mobile station 1001, which maintains an active set, could select the target base station from the active set based on the link condition information.

In this embodiment, mobile station maintains base station 1021, base station 1022, and base station 1023 in its active set. Mobile station 1001 executes the handover in response to the request message. In this example, base station 1023 is selected from the active set as the target base station. After the handover is complete, mobile station 1001 exchanges communications with base station 1023. Base station 1023 exchanges the communications over backhaul link 1033 with ASN gateway 1053. ASN gateway 1053 exchanges the communications with Internet 1062. In this manner, the load on backhaul link 1031 is reduced. Advantageously, performance degradation due to reduced capacity on backhaul link 1031 is alleviated.

Figure 11:
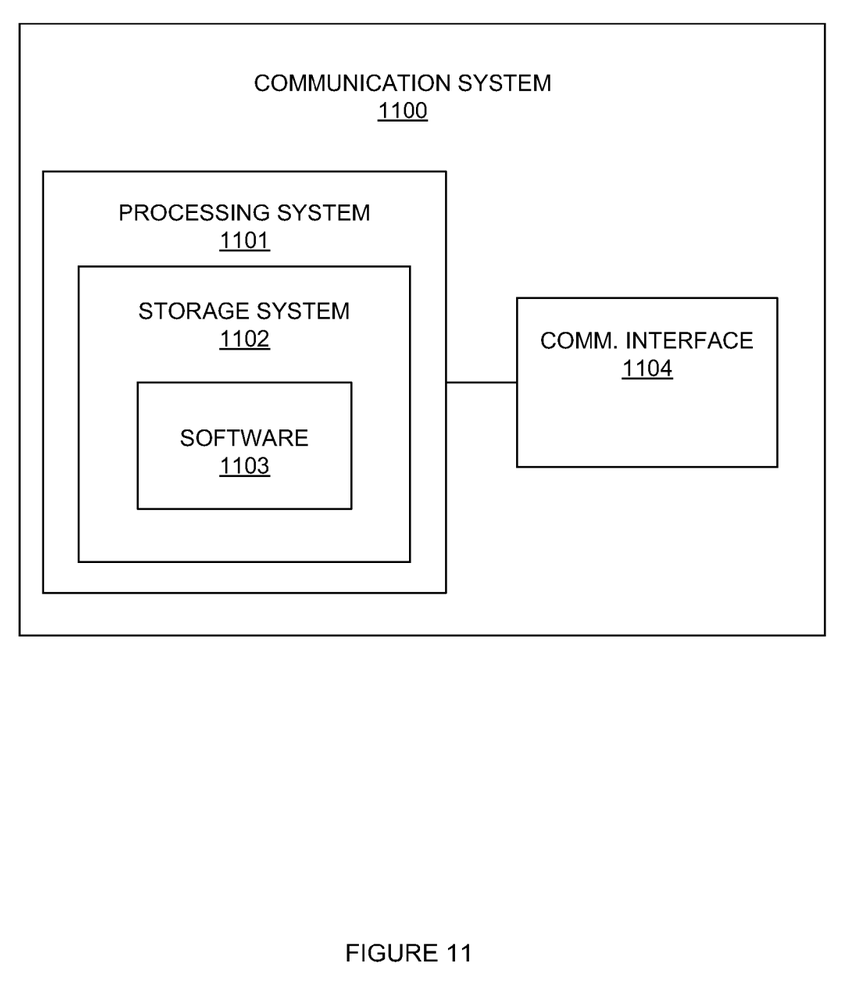
FIG. 11 illustrates a communication system in an exemplary embodiment.

Referring now to FIG. 11, Communication system 1100 includes communication interface 1004 and processing system 1101. Processing system 1101 includes storage system 1102. Storage system 1102 stores software 1103. Processing system 1101 is linked to communication interface 1104. Communication system 1100 could be comprised of a programmed general-purpose computer, although those skilled in the art will appreciate that programmable or special purpose circuitry and equipment may be used. Computer system 1100 may be distributed among multiple devices that together comprise elements 1101-1104.

Communication interface 1104 could comprise a network interface, modem, port, transceiver, or some other communication device. Communication interface 1104 may be distributed among multiple communication devices. Processing system 1101 could comprise a computer microprocessor, logic circuit, or some other processing device. Processing system 1101 may be distributed among multiple processing devices. Storage system 1102 could comprise a disk, tape, integrated circuit, server, or some other memory device. Storage system 1102 may be distributed among multiple memory devices.

Processing system 1101 retrieves and executes software 1103 from storage system 1102. Software 1103 may comprise an operating system, utilities, drivers, networking software, and other software typically loaded onto a computer system. Software 1103 could comprise an application program, firmware, or some other form of machine-readable processing instructions. When executed by processing system 1101, software 1103 directs processing system 1101 to operate as described herein for communication systems, such as mobile stations, base stations, and access nodes, as well as other types of communication systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to manage a handover of a mobile station from a source base station to a target base station, the method comprising:
monitoring a condition of a first backhaul link between the source base station and an access node;
processing the condition of the first backhaul link, a status of an application running on the mobile station, and a status of a file transfer occurring on another mobile station to determine if the handover should be initiated, wherein the status of the application indicates if the application is engaged in a web browsing session, and wherein the status of the file transfer indicates if the file transfer is nearing completion; and in response to determining that the handover should be initiated, transmitting a handover request to initiate the handover.

2. The method of claim 1 further comprising monitoring a condition of a second backhaul link between a second base station and the access node, monitoring a condition of a third backhaul link between a third base station and the access node, and processing the condition of the second backhaul link and the condition of the third backhaul link to select the target base station from the second base station and the third base station.

3. The method of claim 2 further comprising processing a condition of a first wireless link between the mobile station and the source base station and a condition of a second wireless link between the mobile station and the target base station to determine if the handover should be initiated.

4. The method of claim 3 wherein the mobile station communicates with the source base station over the first wireless link in a first protocol and wherein the mobile station communicates with the target base station over the second wireless link in a second protocol wherein the first protocol is a different protocol than the second protocol.

5. The method of claim 2 wherein the first backhaul links comprises an Ethernet link.

6. The method of claim 5 wherein the second backhaul link comprises a T-1 link.

7. The method of claim 1 wherein the condition comprises an available bandwidth of the first backhaul link.

8. The method of claim 1 wherein the status of the application indicates whether the application is participating in a real-time session.

9. The method of claim 1 wherein the status of the application indicates a progress of a file transfer.

10. A communication system for managing a handover of a mobile station from a source base station to a target base station, the communication system comprising:

a processing system configured to monitor a condition of a first backhaul link between the source base station and an access node, a status of an application running on the mobile station, and a status of a file transfer occurring on another mobile station, wherein the status of the application indicates if the application is engaged in a web browsing session, and wherein the status of the file transfer indicates if the file transfer is nearing completion, and process the condition of the first backhaul link, the status of the application, and the status of the file transfer to determine if the handover should be initiated; and an interface configured to transmit a handover request to initiate the handover in response to determining that the handover should be initiated.

11. The communication system of claim 10 wherein the processing system is further configured to monitor a condition of a second backhaul link between a second base station and the access node, monitor a condition of a third backhaul link between a third base station and the access node, and process the condition of the second backhaul link and the condition of the third backhaul link to select the target base station from the second base station and the third base station.

12. The communication system of claim 11 wherein the processing system is further configured to process a condition of a first wireless link between the mobile station and the source base station and a condition of a second wireless link between the mobile station and the target base station to determine if the handover should be initiated.

13. The communication system of claim 12 wherein the mobile station communicates with the source base station over the first wireless link in a first protocol and wherein the mobile station communicates with the target base station over the second wireless link in a second protocol wherein the first protocol is a different protocol than the second protocol.

14. The communication system of claim 11 wherein the first backhaul links comprises an Ethernet link.

15. The communication system of claim 14 wherein the second backhaul link comprises a T-1 link.

16. The communication system of claim 10 wherein the condition comprises an available bandwidth of the first backhaul link.

17. The communication system of claim 10 wherein the status of the application indicates a progress of a file transfer.

18. A non-transitory computer-readable medium having instructions stored thereon for operating a communication system to manage a handover of a mobile station from a source base station to a target base station, wherein the instructions, when executed by the communication system direct the communication system to:

monitor a condition of a first backhaul link between the source base station and an access node;

process the condition of the first backhaul link, a status of an application running on the mobile station, and a status of a file transfer occurring on another mobile station to determine if the handover should be initiated, wherein the status of the application indicates if the application is engaged in a web browsing session, and wherein the status of the file transfer indicates if the file transfer is nearing completion; and in response to determining that the handover should be initiated, transmit a handover request to initiate the handover.

* * * * *